(12) United States Patent
Kuester et al.

(10) Patent No.: US 8,314,362 B2
(45) Date of Patent: Nov. 20, 2012

(54) DEVICE FOR MACHINING A WORKPIECE BY MEANS OF PARALLEL LASER BEAMS

(75) Inventors: Matthias Kuester, Hannover (DE); Christian Krieg, Hannover (DE); Gennadij Kusnezow, Langenhagen (DE); Marc Hueske, Hannover (DE)

(73) Assignee: LPKF Laser & Electronics AG, Garbsen (DE)

( * ) Notice: Subject to any disclaimer, the term of this patent is extended or adjusted under 35 U.S.C. 154(b) by 180 days.

(21) Appl. No.: 12/743,628

(22) PCT Filed: Oct. 31, 2008

(86) PCT No.: PCT/DE2008/001762
§ 371 (c)(1),
(2), (4) Date: Aug. 27, 2010

(87) PCT Pub. No.: WO2009/065373
PCT Pub. Date: May 28, 2009

(65) Prior Publication Data
US 2010/0320178 A1 Dec. 23, 2010

(30) Foreign Application Priority Data

Nov. 21, 2007 (DE) .......................... 10 2007 056 254

(51) Int. Cl.
*B23K 26/00* (2006.01)
(52) U.S. Cl. ................................ 219/121.76

(58) Field of Classification Search ............... 219/121.6, 219/121.76
See application file for complete search history.

(56) References Cited

U.S. PATENT DOCUMENTS

| 4,315,130 | A | 2/1982 | Inagaki et al. |
| 5,403,990 | A | 4/1995 | Fukuchi |
| 6,103,990 | A | 8/2000 | Barenboim et al. |
| 6,252,715 | B1 * | 6/2001 | Rope et al. ............... 359/618 |
| 6,927,109 | B1 | 8/2005 | Tanaka et al. |
| 2006/0072207 | A1 | 4/2006 | Williams et al. |

FOREIGN PATENT DOCUMENTS

| EP | 0624424 A1 | 11/1994 |
| GB | 2015813 A | 9/1979 |
| JP | 59218292 A | 12/1984 |
| JP | 63040694 A | 2/1988 |

* cited by examiner

*Primary Examiner* — William D Coleman
(74) *Attorney, Agent, or Firm* — Leydig, Voit & Mayer, Ltd.

(57) ABSTRACT

A device for processing a workpiece using a plurality of parallel laser beams includes a focusing optical system displaceable in a direction of an axis of symmetry configured to focus each of the plurality of parallel laser beams onto a common focusing plane, and wherein the plurality of laser beams include a first and a second laser beam pair, each containing two laser beams equidistant from the axis of symmetry. The device further includes a reflector assembly having at least two reflectors each having a plurality of reflection surfaces displaceable relative to one another in a direction of the axis of symmetry.

15 Claims, 2 Drawing Sheets

DEVICE FOR MACHINING A WORKPIECE BY MEANS OF PARALLEL LASER BEAMS

This application is a U.S. National Phase application under 35 U.S.C. §371 of International Application No. PCT/DE2008/001762, filed Oct. 31, 2008 and claims benefit to German Patent Application No. DE 10 2007 056 254.5, filed Nov. 21, 2007. The International Application was published in German on May 28, 2009 as WO 2009/065373 under PCT Article 21 (2).

The invention relates to a device for processing a workpiece by means of a plurality of at least approximately parallel laser beams, wherein the device is equipped with at least one focusing optical system for focusing each laser beam onto a common focusing plane.

BACKGROUND

In practice, such a device serves for simultaneous, for example parallel, processing of the workpiece by means of the parallel laser beams. In the case of a simple design, a semitransparent mirror is used as a beam splitter, which is followed in the beam path of at least one laser beam by a reflector in order to thereby generate a parallel beam path. Every laser beam is focused onto a common focusing plane on the workpiece by means of a focusing optical system.

A generic device has been disclosed in for example U.S. Pat. No. 6,103,990 A. Furthermore, devices with a beam splitter are also described in EP 06 24 424 A1 and U.S. Pat. No. 6,927,109 A1.

In practice, the desired, more particularly step-free, adjustability of the spacing between the laser beams was found to be problematic. For this, the reflector can have a moveable design with respect to the beam path of the other laser beam in order to thereby generate the desired spacing.

A disadvantage of this proposed solution was found to be that the change of the spacing was simultaneously connected to the change in the central position of the two laser beams, the latter change having to be compensated for by a superimposed displacement of the entire device. In particular, the laser beams have to be moved by a respectively differing amount, requiring corresponding separate drives in practice.

US 2006/0072207 A1 discloses a polarization filter that is subdivided by electromagnetic radiation into different linearly-polarized radiation. After a different number of reflections of the differently polarized radiation, the deflection in the same direction is brought about.

JP 59218292 A 1 relates to a beam splitter, wherein a lens and a reflector are arranged in the beam path of each partial beam for deflecting the respective partial beam into a common plane parallel to the focusing plane in the direction of mutually opposite deflection surfaces arranged between the reflectors. The deflection surfaces are respectively arranged tilted at an angle of 45° with respect to the focusing plane and are arranged such that they can be displaced perpendicularly to the focusing plane. This achieves step-free adjustment of the relative spacing between adjacent laser beams with an axis of symmetry remaining unchanged.

SUMMARY OF THE INVENTION

An aspect of the present invention provides a simple option for changing the spacing between the laser beams and, in the process, avoiding a change in the focusing plane as a result of the change in the spacing between the parallel laser beams and so the control complexity can be kept to a minimum. More particularly, it should be possible for a change in the spacing to be realized using a single drive.

Thus, according to the invention, provision is made for a device in which four laser beams form at least two laser beam pairs and each laser beam pair is formed by two laser beams equidistant from an axis of symmetry, wherein each laser beam can be deflected on reflection surfaces of at least two reflectors that, together with the focusing optical system, can be displaced, in particular translated, relative to one another in the direction of the axis of symmetry in order to adjust the relative spacing between the adjacent laser beams in the focusing plane, wherein the number of reflections of the laser beams of the first laser beam pair corresponds to three times the number of reflections of the laser beams of the second laser beam pair on the displaceable reflector. What is surprisingly achieved by this for the first time is a step-free adjustment of the relative mutual spacing between the adjacent laser beams with an axis of symmetry remaining unchanged. Here, the first laser beam pair is formed by the outer laser beams with respect to the focusing plane and the second laser beam pair is formed by the inner laser beams with respect to the focusing plane. Due to the multiple reflections of the outer laser beam pair, the change in spacing between the outer laser beams and the axis of symmetry for adjusting the changed relative spacing between the laser beams amongst themselves is three times larger than the change in spacing between the inner laser beams and the axis of symmetry. This makes it possible both to keep a fixed axis of symmetry and ensure a matching spacing between all laser beams amongst themselves. For this, the reflectors are moved relative to one another in the direction of the axis of symmetry by at least the reflection surfaces of one reflector being built on a common platform that can be moved by electromotor. Of course, the reflection surfaces can be designed such that they can be adjusted independently of one another. Furthermore, the various reflection surfaces of a reflector could be combined in a functional unit forming the reflector as separate components or else they could be interconnected in an assembly.

A particularly advantageous embodiment of the present invention is also achieved by virtue of the fact that the displaceable reflection surfaces are designed such that each laser beam of the first laser beam pair is reflected precisely three times and each laser beam of the second laser beam pair is reflected precisely once on the reflection surfaces of the two reflectors. The multiple reflections of the laser beams achieve a threefold increase in the shift perpendicular to the axis of symmetry in a surprisingly simple fashion, and this displacement corresponds to the required value of the shift for maintaining corresponding spacings between all laser beams.

A further particularly expedient refinement of the invention is achieved by virtue of the fact that at least one reflector has a plurality of reflection surfaces assigned to both the first laser beam pair and the second laser beam pair, which surfaces can be displaced together by means of a drive. In particular, this brings about the deflection of all laser beams into the focusing plane on the same reflector, which can thus be produced as an assembly and hence, at the same time, with relatively little complexity.

In principle, the device could be equipped with a single focusing optical system, wherein the laser beams are generated from a common radiation source by means of a beam splitter. However, it is particularly practical when a focusing optical system is assigned to each laser beam and so the focal position of each individual laser beam can be adjusted independently from the others.

Moreover, in the process, it is particularly expedient for the reflection surfaces of the reflector to be displaceably arranged together with the focusing optical system assigned to the laser beams in order to thereby ensure a constant beam path between the focusing optical system and the focusing plane. As a result of this, the focal position of each laser beam remains unchanged and so the spacing can even be changed without problems during the processing process of the workpiece.

Another likewise particularly promising modification is achieved if the reflection surfaces of each reflector and the focusing optical system assigned to the laser beams are combined to form one assembly. This significantly simplifies the common displacement of the reflection surfaces for adjusting the respective spacing.

Another likewise particularly practical embodiment of the present invention is achieved if the reflection surfaces subtend an angle of 45° with the focusing plane and so a profile of the laser beams is obtained which, starting from the focusing optical system, is alternately parallel and perpendicular to the focusing plane or the axis of symmetry.

In the process, each reflector has at least two reflection surfaces that subtend an angle of 90° relative to one another and so the laser beam emanating from the focusing optical system and the laser beam deflected onto the focusing plane follow parallel straight lines in order to keep the design complexity and the control complexity relatively low.

Another likewise particularly expedient modification of the present invention is achieved if the reflectors each have at least two reflection surfaces arranged parallel to reflection surfaces of the respectively other reflector and so the outer laser beams impinging on the focusing plane are reflected a number of times in this region between the reflection surfaces without external influences being able to make themselves noticeable in the process.

The reflection surfaces are fixed in their respectively predetermined position during use in order to thereby ensure precise beam guidance. Nevertheless, the reflection surfaces are designed such that the reflection surfaces of each reflector that cannot be displaced relative to one another during use can be adjusted.

The two reflectors could be arranged such that they can be displaced in opposite directions by means of a common drive. Compared to this, an embodiment is particularly advantageous in which one reflector has a non-displaceable design in order to thereby reduce the design complexity resulting from, for example, the required displacement guides. In the process, at least the reflection surfaces of the displaceable reflector are expediently combined to form one assembly.

BRIEF DESCRIPTION OF THE DRAWINGS

The invention allows various embodiments. One embodiment is illustrated in the drawing and is described in the following text for further clarification of its basic principle. In a schematic diagram.

DETAILED DESCRIPTION

Figure 1:
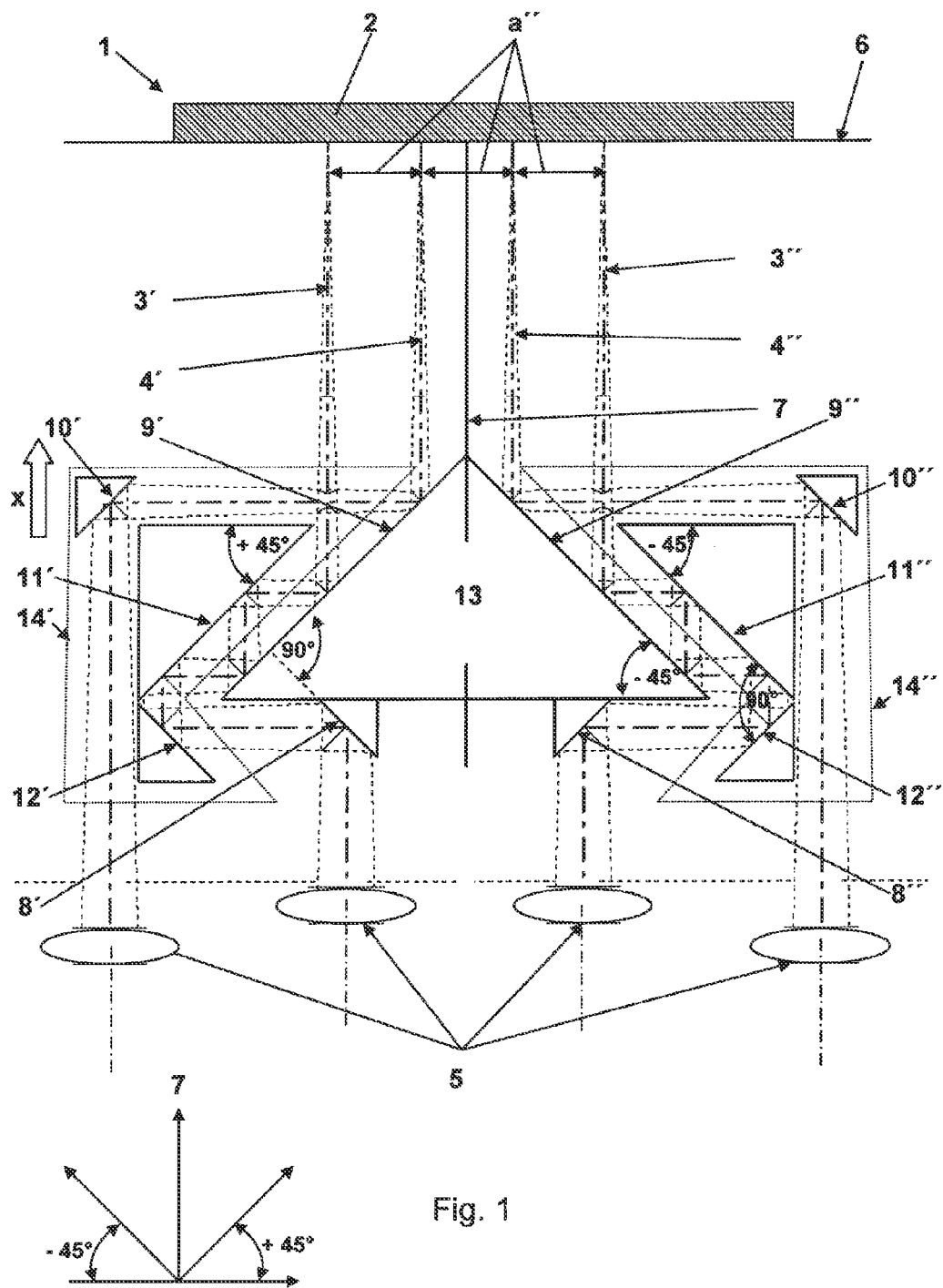
FIG. 1 shows a device according to the invention in a first functional position, in which four parallel laser beams have a large spacing from one another.
Figure 2:
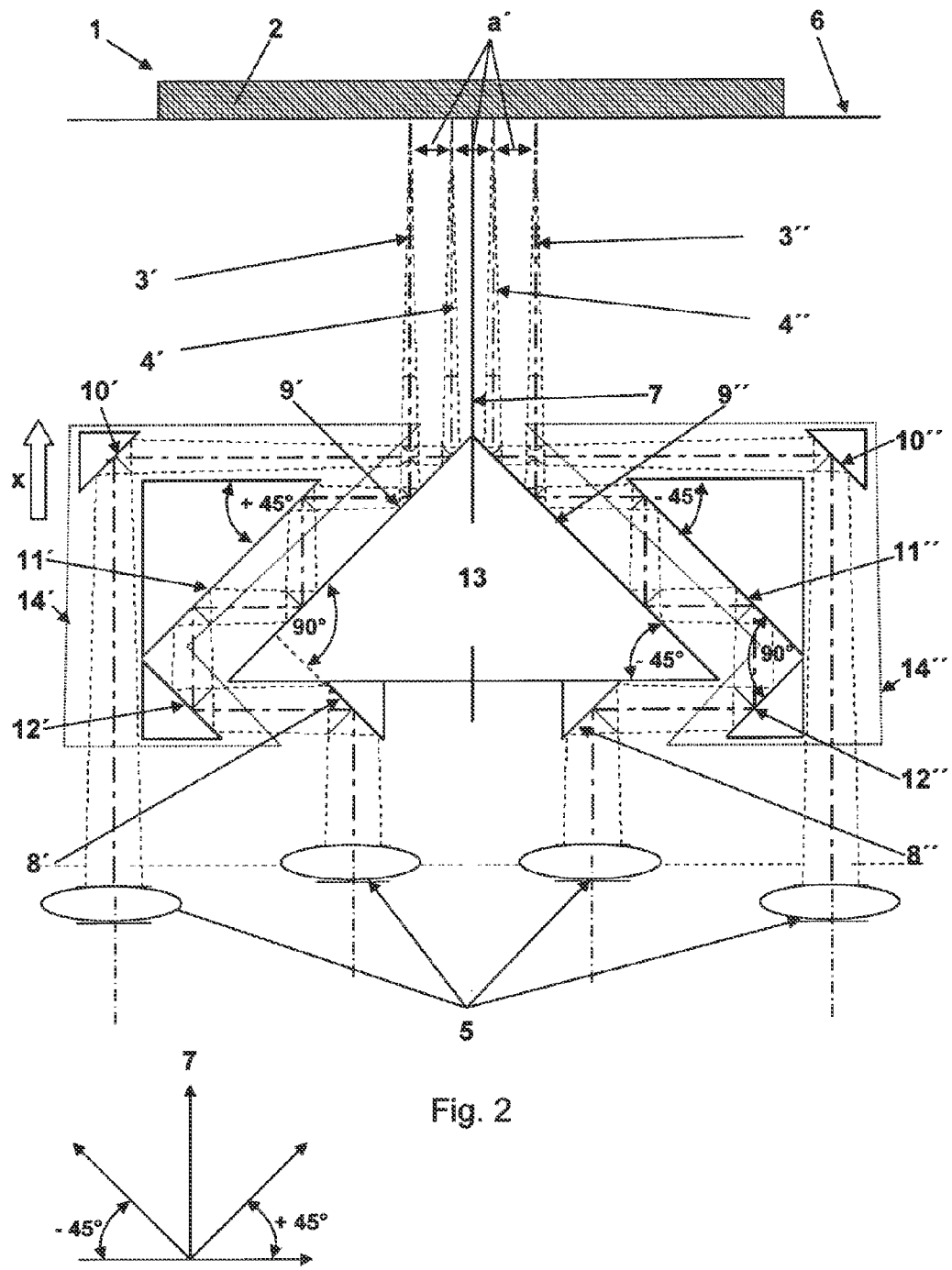
FIG. 2 shows the device shown in FIG. 1 in a second functional position, in which the parallel laser beams have a small spacing from one another.

FIGS. 1 and 2 are used to illustrate the device 1 according to the invention for processing a workpiece 2 in more detail in two functional positions, in which the parallel laser beams 3', 3", 4', 4" have firstly a large spacing a', a" (FIG. 1) and secondly a small spacing a', a" (FIG. 2) between one another. The device 1 has a plurality of focusing optical systems 5 assigned in each case to a laser beam 3', 3", 4', 4" for focusing each laser beam 3', 3", 4', 4" on a common focusing plane 6 on the workpiece 2. The laser beams 3', 3", 4', 4" form an outer first laser beam pair 3 and an inner second laser beam pair 4. The laser beams 3', 3", 4', 4" of each laser beam pair 3, 4 are equidistant from an axis of symmetry 7, independent of the spacing a', a" set in each case. Before the laser beams 3', 3", 4', 4" emanating from the respective focusing optical system 5 impinge on the workpiece 2, each laser beam 3', 3", 4', 4" is deflected on the reflection surfaces 8', 8", 9', 9", 10', 10", 11', 11", 12', 12" of two reflectors 13, 14', 14". In the process, the reflection surfaces 8', 8", 9', 9" of the central non-displaceable reflector 13 form an assembly, while the reflector 14', 14" that can be displaced in the direction of the arrow x is formed by a functional unit made of separate reflection surfaces 10', 10", 11', 11", 12', 12". The laser beams 3', 3" of the outer first laser beam pair 3 are deflected precisely three times on the reflection surfaces 8', 8", 9', 9", 10', 10", 11', 11", 12', 12", and the laser beams 4', 4" of the inner second laser beam pair 4 are deflected precisely once thereon. This reflection ratio of 3:1 leads to a relative displacement of the reflectors 13, 14', 14" with a magnitude of Δx in the direction of the arrow x parallel to the axis of symmetry 7, leading to a magnitude of a shift of the outer laser beams 3', 3" that is three times larger than that of the inner laser beams 4', 4", resulting in the spacing a', a" between any laser beams 3', 3", 4', 4" and the respectively adjoining laser beam 3', 3", 4', 4" always remaining constant with the relationship a"=a'+2Δx, independent of the absolute position. In order to avoid a shift of the focusing plane 6 in this case, the focusing optical systems 5 respectively assigned to the laser beams 3', 3", 4', 4" can also be moved together with the reflection surfaces 10', 10", 11', 11", 12', 12" of the reflector 14', 14" by means of a drive (not illustrated). Here, each reflection surface 10', 10", 11', 11", 12', 12" of the displaceable reflector 14', 14" is assigned a reflection surface 8', 8", 9', 9" parallel thereto of the other reflector 13, which each subtend an angle of 45° with the focusing plane 6, wherein each reflector 13, 14', 14" has at least two reflection surfaces subtending an angle of 90° relative to one another.

The invention claimed is:

1. A device for processing a workpiece using a plurality of parallel laser beams comprising:
a focusing optical system displaceable in a direction of an axis of symmetry configured to focus each of the plurality of parallel laser beams onto a common focusing plane, and wherein the plurality of laser beams include a first and a second laser beam pair, each containing two laser beams equidistant from the axis of symmetry; and
a reflector assembly having at least two reflectors, each having a plurality of reflection surfaces displaceable relative to one another in a direction of the axis of symmetry so as to adjust a relative spacing between the plurality of laser beams on the focusing plane, wherein the plurality of reflection surfaces of the at least two reflectors are configured to deflect the two laser beams of the first laser beam pair so as to form a plurality of first reflections and to deflect the two laser beams of the second laser beam pair so as to form a plurality of second reflections, and wherein a number of the first reflections corresponds to three times the number of the second reflections, wherein each of the plurality of reflection surfaces is disposed at an angle of −45° or +45° with respect to the axis of symmetry.

2. The device as recited in claim 1, wherein the two laser beams of the first laser beam pair are disposed outwardly with respect to the two laser beams of the second laser beam pair relative to the focusing plane.

3. The device as recited in claim 1, wherein the plurality of reflection surfaces of the at least two reflectors are configured to reflect each laser beam of the first laser beam pair three times and configured to reflect each laser beam of the second laser beam pair one time.

4. The device as recited in claim 1, wherein at least one of the at least two reflectors is displaceable using a drive.

5. The device as recited in claim 1, wherein the at least one focusing optical system is includes a plurality of optical units, each corresponding to one of the plurality of laser beams.

6. The device as recited in claim 1, wherein each of the plurality of reflection surfaces of the at least two reflectors subtend an angle of +45° or −45° with the focusing plane.

7. The device as recited in claim 1, wherein at least two of the plurality of reflection surfaces of each of the at least two reflectors subtend an angle of 90° relative to one another.

8. The device as recited in claim 1, wherein each of the at least two reflectors includes at least one reflection surface disposed at an angle of +45° relative to the axis of symmetry and at least reflection surface disposed at an angle of −45° relative to the axis of symmetry.

9. The device as recited in claim 1, wherein at least two of the plurality of reflection surfaces of a first of the at least two reflectors are disposed parallel to at least one reflection surface of a second of the two reflectors.

10. The device as recited in claim 1, wherein a position of at least one of the at least two reflectors is fixed relative to the focusing plane.

11. The device as recited in claim 1, wherein the axis of symmetry is perpendicular to the focusing plane.

12. The device as recited in claim 1, wherein the plurality of reflection surfaces of one of the at least two reflectors are not displaceable relative to each other.

13. The device as recited in claim 5, wherein at least one of the at least two reflectors is connected to the focusing optical system and displaceable together with the focusing optical system.

14. The device as recited in claim 8, wherein the at least one reflection surface disposed at an angle of −45° is configured to reflect a first laser beam of the first laser beam pair one time, and wherein the at least one reflection surface disposed at an angle of +45° is configured to reflect the first laser beam two times.

15. The device as recited in claim 8, wherein the at least one reflection surface disposed at an angle of +45° is configured to reflect a second laser beam of the first laser beam pair one time, and wherein the at least one reflection surface disposed at an angle of −45° is configured to reflect the second laser beam two times.

* * * * *